Patented Feb. 22, 1938

2,108,810

UNITED STATES PATENT OFFICE 2,108,810

TRANSPARENT MATERIAL AND COMPOSITION OF MATTER FOR PRODUCING SAME

Theron G. Finzel and Donald E. Drew, Kenmore, N. Y., assignors, by mesne assignments, to E. I. du Pont de Nemours & Company, Wilmington, Del., a corporation of Delaware No Drawing. Application June 26, 1934, Serial No. 732,444

32 Claims. (Cl. 91—68)

This invention relates to the art of coating. More particularly, it relates to compositions for moistureproofing, with or without simultaneously transparentizing, cellulose bases, and also to the final product which is suitable for use as a wrapping tissue.

In the treatment of flexible materials, such as regenerated cellulose sheeting and paper, either of the porous or non-porous type, with compositions for the purpose of moistureproofing, with or without simultaneous transparentization, it is, in many cases, necessary to subject the treated materials to an elevated temperature to remove the solvents of the compositions. Because of the loss of moisture from the regenerated cellulose sheeting or paper occasioned by the elevated temperature treatment, the products are in many cases more brittle than is desirable. This is true even when the lacquers contain plasticizers for the ingredients thereof. The previously mentioned coated materials also tend to lose some of their flexibility when exposed to a dry atmosphere.

We have found that we can overcome the above-mentioned disadvantages by incorporating in the selected composition a substance which will soften the material being treated.

It is, therefore, an object of this invention to provide a composition suitable for moistureproofing, with or without transparentizing, cellulose materials and containing a softener for the cellulose base.

Another object of this invention is to provide a composition containing a glycol, said composition being adapted to moistureproof cellulose materials.

Other objects will become apparent from the following description and appended claims.

In one aspect, the instant invention contemplates a composition which, when applied to cellulose bases, will moistureproof the same. The compositions are also characterized by the fact that when they are applied to an opaque base, such as porous paper or a non-porous base, such as glassine paper, they will also transparentize said base.

In accordance with the principles of this invention, there is incorporated in the composition a cellulose softener. The cellulose base, when the composition is applied thereto, absorbs a sufficient quantity of the softener from the composition, whereby the brittleness of the final product is materially reduced. It is to be noted that the cellulose softener which is incorporated in the composition need not function as a plasticizer for the lacquer. Also, the usual plasticizers incorporated in the lacquers do not soften the cellulose base but merely plasticize the ingredients constituting the lacquer.

The cellulose softeners which are contemplated by the instant invention are water-soluble, possess low volatility, are soluble in lacquer solvents, such as a mixture of ethyl acetate, ethyl alcohol, butyl acetate and toluol; or mixtures of toluol and monobutyl ether of ethylene glycol; or a mixture of naphtha and ethyl alcohol; or a mixture of ethyl acetate, toluol and monobutyl ether of ethylene glycol; or any other solvent mixture. The cellulose softeners should also be compatible, at least in degree, with the lacquer solids and should be partly soluble and preferably miscible with the lacquer plasticizer. As illustrative examples of such cellulose softeners may be mentioned the glycols, for example, ethylene glycol, diethylene glycol, triethylene glycol, isopropylidene glycol and the like, or glycol derivatives, such as glycol monoacetate or other mono or di ethers or esters of glycol, used alone or in admixture with each other or in admixture with substances, such as triethanolamine, glycerin, the di, tri or poly glycerols, glyceryl mono or diacetate, mono or di esters or ethers of glycerol, sulphonated castor oil or other sulphonated oils.

The quantity of cellulose softener which is incorporated in the lacquer may vary within wide limits. Satisfactory results have been secured when 1% to 50% of cellulose softener, the percentage being based on the lacquer solids, is incorporated in the lacquer. The expression "lacquer solids" employed in this specification is intended to define those ingredients of the lacquer exclusive of the lacquer solvents. The quantity of the specific cellulose softener should not be such as to render the final product sticky. Hereafter are set forth the maximum percentages of several illustrative specific cellulose softeners based on the lacquer solids which give the desired results:

| Softener | Percentage in lacquer solids |
|---|---|
|  | Percent |
| Ethylene glycol | 48.2 |
| Diethylene glycol | 29.3 |
| Triethylene glycol | 23.6 |
| Isopropylidene glycol | 50.5 |

The cellulose base which is treated may consist of regenerated cellulose sheeting or paper, either of the porous or non-porous type. When the base is of a non-transparent material, such as paper, then the composition is of such a nature as to simultaneously moistureproof and transparentize the same. When the base consists of transparent regenerated cellulose sheeting, the composition is of the type which will moistureproof the same without in any way impairing the desirable characteristics, i. e., transparency and flexibility of the surface of said cellulose sheeting. The surfaces of the final product are further characterized in that they are glossy and possess good surface slip.

As illustrative compositions which may be used, in accordance with the instant invention, may be mentioned the following:

(1) Cellulose derivative, resin, plasticizer, wax, solvent;
(2) Cellulose derivative, plasticizer, wax, solvent;
(3) Cellulose derivative, resin, wax, solvent;
(4) Cellulose derivative, wax, solvent;
(5) Resin, plasticizer, wax, solvent;
(6) Resin, wax, solvent.

In formulating any of the previously-mentioned moistureproofing lacquer compositions containing the cellulose softener, it may in many cases be necessary to adjust the solvent mixtures of the lacquers so as to produce compatibility of the cellulose softener with the other lacquer ingredients, both solids and solvents.

The cellulose derivative of the lacquer may be cellulose nitrate, cellulose acetate, etc., or cellulose ether, such as ethyl cellulose, or any cellulose ester ether.

The resin may be a natural or synthetic resin or resin-like material, either soft or brittle. Such resins may include gum dammar, rosin, hydrogenated rosin, hydrogenated rosin esters, gum mastic, shellac, the rosin ester of ethylene glycol or diethylene glycol, Amberol, the glyptals, the rosin ester of glycerin or any other commonly-used lacquer resin.

As the lacquer plasticizer, any cellulose derivative lacquer plasticizer may be used. Dibutyl phthalate, dibutyl tartrate, tricresyl phosphate, diphenyl phosphate and ethyl meta toluene sulphonamide are illustrative examples thereof. Some plasticizers are not completely miscible with the cellulose softener, so that with such a plasticizer only a limited amount of softener may be incorporated in the lacquer. In the preferred embodiment of the invention, the plasticizer and cellulose softener are of the type which are mutually miscible throughout the entire range of plasticizer and cellulose softener concentration. Such a system will permit the widest latitude in the use of the cellulose softener in the lacquer. As an illustrative combination wherein the ingredients are miscible in all proportions is ethylene meta toluene sulphonamide as the lacquer plasticizer, and diethylene glycol as the cellulose softener.

Any waxy or wax-like substance having a moistureproofing effect may be used. The preferred moistureproofing waxes are the paraffins, particularly the paraffins of high melting points.

The solvent composition of the lacquer will depend upon the nature of the cellulose derivative, upon the nature of the resin, the wax and also the use to which the lacquer is to be put. Due to the presence of the wax, the solvent will also contain a large proportion of wax solvent, such as toluene or naphtha. It is preferable to use a fairly large proportion of ethyl, butyl or other alcohols or equivalent material in the solvent to act as a blending agent for the cellulose softener and the rest of the lacquer ingredients. The alcohol content of the solvent may vary between 5% and 20%, the percentage being based on the solvent alone.

The proportions of the lacquer solids are such that, when applied to regenerated cellulose sheeting, a transparent, moistureproof, non-tacky coating is secured. When the lacquer is to be used for transparentizing and moistureproofing paper, the proportions of the ingredients should be such that the composition, after a major portion of the solvents, for example 90% thereof, has been evaporated at an elevated temperature, the lacquer solids will possess the characteristics of hot flow. Such compositions are more fully explained in copending application, Serial No. 717,938, filed March 29, 1934.

In order to more clearly explain the instant invention, the following illustrative compositions, consisting of the ingredients in approximately the percentages (by weight) set forth, are given:

Example I

| Solids: | Percent |
|---|---|
| Rosin | 57.0 |
| Ethyl cellulose | 28.5 |
| Paraffin | 7.4 |
| Triethylene glycol | 7.1 |
|  | 100.0 |

| Solvent: | Percent |
|---|---|
| Toluene | 85.0 |
| Monobutyl ether of ethylene glycol | 15.0 |
|  | 100.0 |

| | Percent |
|---|---|
| Solids content | 11–22 |

Example II

| Solids: | Percent |
|---|---|
| Rosin | 48.8 |
| Ethyl cellulose | 24.4 |
| Ethyl meta toluene sulphonamide | 6.1 |
| Paraffin | 7.3 |
| Diethylene glycol | 13.4 |
|  | 100.0 |

| Solvent: | Percent |
|---|---|
| Low flash naphtha | 90.0 |
| Acetone | 1.0 |
| Ethyl alcohol | 9.0 |
|  | 100.0 |

| | Percent |
|---|---|
| Solids content | 11–22 |

Example III

| Solids: | Percent |
|---|---|
| Ester gum | 42.5 |
| Ethyl cellulose | 34.1 |
| Dibutyl phthalate | 6.4 |
| Paraffin | 4.3 |
| Diethylene glycol | 12.7 |
|  | 100.0 |

| Solvent: | Percent |
|---|---|
| High flash naphtha | 80.0 |
| Acetone | 2.0 |
| Ethyl alcohol | 18.0 |
|  | 100.0 |

| | Percent |
|---|---|
| Solids content | 11–21 |

Example IV

Solids: | Percent
---|---
Ethyl cellulose | 69.3
Ethyl meta toluene sulphonamide | 7.0
Paraffin | 2.8
Diethylene glycol | 7.0
Monoethyl ether of glycerol | 13.9
| 100.0

Solvent: | Percent
---|---
Toluol | 85.0
Monobutyl ether of ethylene glycol | 15.0
| 100.0

Solids content | Percent
---|---
| 10–16

Example V

Solids: | Percent
---|---
Ethyl cellulose | 75.7
Paraffin | 1.6
Triethylene glycol | 15.1
Diethylene glycol | 7.6
| 100.0

Solvent: | Percent
---|---
Toluol | 85.0
Monobutyl ether of ethylene glycol | 15.0
| 100.0

Solids content | Percent
---|---
| 7–15

Example VI

Solids: | Percent
---|---
Rosin | 76.9
Ethyl meta toluene sulphonamide | 7.7
Paraffin | 7.7
Diethylene glycol | 7.7
| 100.0

Solvent: | Percent
---|---
Toluol | 85.0
Monobutyl ether of ethylene glycol | 15.0
| 100.0

Solids content | Percent
---|---
| 20–30

Example VII

Solids: | Percent
---|---
Rosin | 66.6
Paraffin | 13.4
Diethylene glycol | 20.0
| 100.0

Solvent: | Percent
---|---
Toluol | 85.0
Monobutyl ether of ethylene glycol | 15.0
| 100.0

Solids content | Percent
---|---
| 25–30

Example VIII

Solids: | Percent
---|---
½ second nitrocotton | 71.4
Triethanolamine | 14.3
Triethylene glycol | 14.3
| 100.0

Solvent: | Percent
---|---
Ethyl acetate | 72.0
Ethyl alcohol | 4.0
Monobutyl ether of ethylene glycol | 24.0
| 100.0

Solids content | Percent
---|---
| 12–16

Example IX

Solids: | Percent
---|---
½ second nitrocotton | 52.6
Rosin ester of diethylene glycol | 26.3
Diethylene glycol | 10.5
Sulphonated castor oil | 10.6
| 100.0

Solvent: | Percent
---|---
Ethyl acetate | 64.8
Pentasol acetate | 16.2
Monobutyl ether of ethylene glycol | 16.2
Ethyl alcohol | 2.8
| 100.0

Solids content | Percent
---|---
| 12–15

When the base to be treated consists of paper, either porous or non-porous, the procedure is substantially the same as that set forth in copending application, Serial No. 717,938, filed Mar. 29, 1934. When the base consists of regenerated cellulose, the base is coated in any suitable manner with the selected composition, and, after removal of the excess composition, subjected to a temperature at least equal to the melting point of the wax in the composition.

The ratio of the lacquer to the weight of the paper depends upon the thickness and type of paper which has been used and also the degree to which the paper has been calendered. In any case, it is necessary to have sufficient lacquer solids applied to the paper to cover all the surface fibers in addition to filling all the interspaces between the fibers. Within reasonable limits, the greater the quantity of lacquer solids applied to the papers, the greater will be the transparency of the finished product. Further, the thickness of the final product is dictated by the economics of the process. Satisfactory results have been secured when the base consisting of porous paper does not exceed 0.002" in thickness, and is preferably 0.0005" to 0.0014", and the total quantity of the lacquer solids is at least 25% by weight of the product. When the base consists of non-porous paper, such as glassine paper, having an average thickness of 0.0007", it shows remarkably good light transmission and freedom from haze when impregnated and coated to produce a final product, the average thickness of which is 0.0008" to 0.0012". Such a product corresponds to one having at least 10% by weight of the lacquer solids based on the final product. For any type of paper, the thinner the base, the more transparent will be the final product. When the base consists of regenerated cellulose sheeting, satisfactory results have been secured when regenerated cellulose sheeting, approximately 0.0009" thick, is provided with coatings on each side thereof 0.00002" to 0.0001", and preferably 0.00005", thick.

For the purposes of this specification and claims, we define moistureproof materials as those which, in the form of continuous, unbroken sheets or films, permit the passage of not more than 690 grams of water vapor per 100 square meters per hour, over a period of 24 hours, at approximately 39.5° C.±0.5° C., the relative humidity of the atmosphere at one side of the film being maintained at least at 98%, and the relative humidity of the atmosphere at the other side being maintained at such a value as to give a humidity differential of at least 95%.

Moistureproofing coating compositions are defined as those which, when laid down in the form of a thin, continuous, unbroken film applied uniformly as a coating with a total coating thickness not exceeding 0.0005" to both sides of a sheet of regenerated cellulose of thickness approximately 0.0009", will produce a coated product which is moistureproof.

For the purposes of experimental tests, especially for those materials adaptable as coating compositions, moistureproof materials include those substances, compounds or compositions which, when laid down in the form of a continuous, unbroken film applied uniformly as a coating with a total coating thickness not exceeding 0.0005" to both sides of a sheet of regenerated cellulose of thickness approximately 0.0009", will produce a coated sheet which will permit the passage therethrough of not more than 690 grams of water vapor per 100 square meters per hour over a period of approximately 24 hours, at a temperature of 39.5° C.±0.5° C. (preferably 39.5° C.±0.25° C.), with a water vapor pressure differential of 50–55 mm. (preferably 53.4±0.7 mm.) of mercury. For convenience, the number of grams of water vapor passed under these conditions may be referred to as "the permeability value". An uncoated sheet of regenerated cellulose having a thickness of approximately 0.0009" will show a permeability value of the order of 6900.

In many cases, the moistureproofness is 20, 30, 40, 50 and up to 100 or more times better than the untreated paper. The product is relatively impermeable to air and other gases. It is odorless, glossy and possesses a surface which approaches optical smoothness. It has an advantage over moistureproofed regenerated cellulose in cost and, additionally, in more favorable expansion and shrinkage characteristics. The extent of expansion and shrinkage with changes in humidity is practically negligible compared with either coated regenerated cellulose sheeting or coated glassine paper. As compared with waxed papers, besides being more transparent and less hazy, it shows a higher area coverage per pound of product and is less smeary. It is flexible but not sticky and has a dry-feeling surface, so that several sheets will slip very readily over each other. This easy slip facilitates handling of the product in automatic wrapping machines.

The product of this invention is truly heat-sealable. When the product herein described is heat-sealed, there will be produced a joint or seal which is stronger than that produced by the heat sealing of materials of the prior art, such as that described in United States Letters Patent No. 1,737,187.

The following test has been devised to determine and test the strength of the joints before mentioned:

Strips of the coated material 1.5" wide are superposed on one end, so that the opposite faces of the film are in contact. A seal is made across the width of the material by imposing thereon a heated iron weighing 1,500 grams for 2 seconds. The iron is so designed as to cause a seal to be made of a width of $\frac{1}{32}$ of an inch, the iron being maintained in any suitable manner at a temperature above 130° C. and below 200° C., as, for instance, 150° C. Two strips so sealed are opened at the free end and placed in a stretching device, such as a Suter testing machine, by gripping each end of the sheet in suitable clamps, one of which is fixed and the other of which is moved away at a constant speed of 12" per minute. The force in grams required to pull the sheets apart is taken as a measure of the strength of the bond and is referred to herein as "heat-sealing value".

Though the invention has been described in connection with compositions for simultaneously moistureproofing and transparentizing papers, it is obvious that the principles thereof are equally applicable to compositions for transparentizing paper without moistureproofing the same.

Since it is obvious that various modifications may be made in the above description without departing from the nature or spirit thereof, this invention is not restricted thereto except as set forth in the appended claims.

We claim:

1. A composition for simultaneously transparentizing and moistureproofing sheets of cellulose material comprising a lacquer containing a moistureproofing waxy substance and a substance, selected from the class which consists of glycols and glycol derivatives, for softening said cellulose material.

2. A composition for simultaneously transparentizing and moistureproofing sheets of cellulose material comprising a lacquer containing a moistureproofing waxy substance and approximately 1% to approximately 50% by weight, based on the solid ingredients, of a substance, selected from the class which consists of glycols and glycol derivatives, for softening said cellulose material.

3. A composition for simultaneously transparentizing and moistureproofing sheets of cellulose material comprising a lacquer containing a moistureproofing waxy substance and a dihydric ether alcohol for softening said cellulose material.

4. A composition for simultaneously transparentizing and moistureproofing sheets of cellulose material comprising a lacquer containing a moistureproofing waxy substance and approximately 1% to approximately 50% by weight, based on the solid ingredients, of a dihydric ether alcohol for softening said cellulose material.

5. A composition for simultaneously transparentizing and moistureproofing sheets of cellulose material comprising a lacquer containing a moistureproofing waxy substance and diethylene glycol for softening said cellulose material.

6. A composition for simultaneously transparentizing and moistureproofing sheets of cellulose material comprising a lacquer containing a moistureproofing waxy substance and up to approximately 30% by weight, based on the solid ingredients, of diethylene glycol for softening said cellulose material.

7. A composition for simultaneously transparentizing and moistureproofing sheets of cellulose material comprising a lacquer containing a moistureproofing waxy substance and triethylene glycol for softening said cellulose material.

8. A composition for simultaneously transparentizing and moistureproofing sheets of cellulose material comprising a lacquer containing a moistureproofing waxy substance and up to approximately 24% by weight, based on the solid ingredients, of triethylene glycol for softening said cellulose material.

9. An article of manufacture comprising a sheet of cellulose material combined with a transparentizing and moistureproofing composition comprising lacquer solids containing a moistureproofing waxy substance and a substance, selected from the class which consists of glycols and glycol derivatives, for softening said cellulose material.

10. An article of manufacture comprising a sheet of cellulose material combined with a transparentizing and moistureproofing composition comprising lacquer solids containing a moistureproofing waxy substance and approximately 1% to approximately 50% by weight, based on said composition, of a substance, selected from the class which consists of glycols and glycol derivatives, for softening said cellulose material.

11. An article of manufacture comprising a sheet of cellulose material combined with a transparentizing and moistureproofing composition comprising lacquer solids containing a moistureproofing waxy substance and a dihydric ether alcohol for softening said cellulose material.

12. An article of manufacture comprising a sheet of cellulose material combined with a transparentizing and moistureproofing composition comprising lacquer solids containing a moistureproofing waxy substance and approximately 1% to approximately 50% by weight, based on the composition, of a dihydric ether alcohol for softening said cellulose material.

13. An article of manufacture comprising a sheet of cellulose material combined with a transparentizing and moistureproofing composition comprising lacquer solids containing a moistureproofing waxy substance and diethylene glycol for softening said cellulose material.

14. An article of manufacture comprising a sheet of cellulose material combined with a transparentizing and moistureproofing composition comprising lacquer solids containing a moistureproofing waxy substance and up to approximately 30% by weight, based on the composition, of diethylene glycol for softening said cellulose material.

15. An article of manufacture comprising a sheet of cellulose material combined with a transparentizing and moistureproofing composition comprising lacquer solids containing a moistureproofing waxy substance and triethylene glycol for softening said cellulose material.

16. An article of manufacture comprising a sheet of cellulose material combined with a transparentizing and moistureproofing composition comprising lacquer solids containing a moistureproofing waxy substance and up to approximately 24% by weight, based on the composition, of triethylene glycol for softening said cellulose material.

17. An article of manufacture comprising regenerated cellulose sheeting coated with a composition comprising lacquer solids containing a moistureproofing waxy substance and a dihydric ether alcohol for softening said regenerated cellulose.

18. An article of manufacture comprising regenerated cellulose sheeting coated with a composition comprising lacquer solids containing a moistureproofing waxy substance and approximately 1% to approximately 50% by weight, based on the composition of a dihydric ether alcohol for softening said regenerated cellulose.

19. An article of manufacture comprising regenerated cellulose sheeting coated with a composition comprising lacquer solids containing a moistureproofing waxy substance and diethylene glycol for softening said regenerated cellulose.

20. An article of manufacture comprising regenerated cellulose sheeting coated with a composition comprising lacquer solids containing a moistureproofing waxy substance and up to approximately 30% by weight, based on the composition, of diethylene glycol for softening said regenerated cellulose.

21. An article of manufacture comprising thin, porous paper impregnated with a transparentizing and moistureproofing composition comprising lacquer solids containing a moistureproofing waxy substance and a dihydric ether alcohol for softening said paper.

22. An article of manufacture comprising thin, porous paper impregnated with a transparentizing and moistureproofing composition comprising lacquer solids containing a moistureproofing waxy substance and approximately 1% to approximately 50% by weight, based on the composition, of a dihydric ether alcohol for softening said paper.

23. An article of manufacture comprising thin, porous paper impregnated with a transparentizing and moistureproofing composition comprising lacquer solids containing a moistureproofing waxy substance and diethylene glycol for softening said paper.

24. An article of manufacture comprising thin, porous paper impregnated with a transparentizing and moistureproofing composition comprising lacquer solids containing a moistureproofing waxy substance and up to approximately 30% by weight, based on the composition, of diethylene glycol for softening said paper.

25. An article of manufacture comprising glassine paper coated with a transparentizing and moistureproofing composition comprising lacquer solids containing a moistureproofing waxy substance and a dihydric ether alcohol for softening said paper.

26. An article of manufacture comprising glassine paper coated with a transparentizing and moistureproofing composition comprising lacquer solids containing a moistureproofing waxy substance and approximately 1% to approximately 50% by weight, based on the composition, of a dihydric ether alcohol for softening said paper.

27. An article of manufacture comprising glassine paper coated with a transparentizing and moistureproofing composition comprising lacquer solids containing a moistureproofing waxy substance and diethylene glycol for softening said paper.

28. An article of manufacture comprising glassine paper coated with a transparentizing and moistureproofing composition comprising lacquer solids containing a moistureproofing waxy substance and up to approximately 30% by weight, based on the composition, of diethylene glycol for softening said paper.

29. A transparent, flexible and moistureproof article of manufacture comprising a sheet of cellulose material combined with a composition comprising lacquer solids containing a transparentizing agent, a moistureproofing waxy substance and a substance selected from the class which consists of glycols and glycol derivatives, the ingredients being present in proportions to produce a transparent, flexible and moistureproof product.

30. A transparent, flexible and moistureproof article of manufacture comprising a sheet of cellulose material combined with a composition comprising lacquer solids containing a transparentizing agent, a moistureproofing waxy substance and a dihydric ether alcohol, the ingredients being present in proportions to produce a transparent, flexible and moistureproof product.

31. A transparent, flexible and moistureproof article of manufacture comprising a sheet of paper combined with a composition comprising lacquer solids containing a transparentizing agent, a moistureproofing waxy substance and a substance selected from the class which consists of glycols and glycol derivatives, the ingredients being present in proportions to produce a transparent, flexible and moistureproof product.

32. A transparent, flexible and moistureproof article of manufacture comprising a sheet of paper combined with a composition comprising lacquer solids containing a transparentizing agent, a moistureproofing waxy substance and a dihydric ether alcohol, the ingredients being present in proportions to produce a transparent, flexible and moistureproof product.

THERON G. FINZEL.
DONALD E. DREW.